(12) United States Patent
Klicnik et al.

(10) Patent No.: US 6,748,396 B2
(45) Date of Patent: Jun. 8, 2004

(54) INDEPENDENT CLASS LOADER FOR DYNAMIC CLASS LOADING

(75) Inventors: Vladimir Klicnik, Oshawa (CA); Jeffrey A. McAffer, Ottawa (CA); John D. Wiegand, Eden Prairie, MN (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 09/872,963

(22) Filed: Jun. 1, 2001

(65) Prior Publication Data

US 2002/0184226 A1 Dec. 5, 2002

(51) Int. Cl.[7] .............................................. G61G 17/30
(52) U.S. Cl. .................. 707/103 Y; 709/332
(58) Field of Search .......................... 707/103 Y, 102, 707/6, 10; 717/127, 128, 129; 709/331, 332, 316, 315

(56) References Cited

U.S. PATENT DOCUMENTS

| | | | |
|---|---|---|---|
| 5,815,661 A | 9/1998 | Gosling | 395/200.46 |
| 5,893,118 A | 4/1999 | Sonderegger | 707/203 |
| 5,966,542 A | 10/1999 | Tock | 395/712 |
| 6,112,025 A * | 8/2000 | Mulchandani et al. | 709/331 |
| 6,154,742 A * | 11/2000 | Herriot | 707/10 |
| 6,292,827 B1 * | 9/2001 | Raz | 709/217 |
| 6,330,006 B1 * | 12/2001 | Goodisman | 345/762 |
| 6,381,737 B1 * | 4/2002 | Click et al. | 717/136 |
| 6,493,870 B1 * | 12/2002 | Madany et al. | 717/165 |

\* cited by examiner

*Primary Examiner*—Safet Metjahic
*Assistant Examiner*—Sana Al-Hashemi
(74) *Attorney, Agent, or Firm*—Gregory M. Doudnikoff; Marcia L. Doubet

(57) ABSTRACT

Improved techniques are defined for dynamically loading components which have prerequisite relationships more complex than the simple single inheritance chains which are supported with prior art dynamic class loading techniques. Multiple prerequisites are supported in this improved technique, and in preferred embodiments, an arbitrary number of prerequisites may be explicitly specified for a component. Furthermore, techniques are disclosed which enable delaying the loading and initialization of components until such time as a class in the component is actually needed, thereby improving overall efficiency of the system. Optional filtering and export aspects may also be supported to selectively expose classes for use by dependent components and to enable a component to opt out of re-exporting the classes of its prerequisites, respectively.

10 Claims, 9 Drawing Sheets

- 310 Parent
  classpath = rt.jar (expose="*")
  prerequisites =

- 320 Platform
  classpath = platform.jar (expose="*")
  prerequisites =

- 330 Example
  classpath = example.jar (expose="*")
  prerequisites = P (export="true")

- 340 P
  classpath = P.jar (expose="*.api.*"), internal.jar (expose="")
  prerequisites = R (export="false"), Q (export="true"), T (export="false")

- 350 Q
  classpath = Q.jar (expose="*")
  prerequisites = S (export="true")

- 360 R
  classpath = R.jar (expose="Bar")
  prerequisites =

- 370 S
  classpath = S.jar (expose="*")
  prerequisites = R (export="true")

- 380 T
  classpath = T.jar (expose="*")
  prerequisites =

| | |
|---|---|
| 510 | (Parent) cache, Parent => found |
| 520 | (Example) cache, Parent, Example => found |
| 530 | (Platform) cache, Parent, Example, Platform => found |
| 540 | (P) cache, Parent, Example, Platform, P => found |
| 550 | (Q) cache, Parent, Example, Platform, P, R (skipped), Q => found |
| 560 | (R) cache, Parent,Eexample, Platform, P, R (skipped), Q, S, R => found |
| 570 | (S) cache, Parent, Example, Platform, P, R (skipped), Q, S => found |
| 580 | (nowhere) cache, Parent, Example, Platform, P, R (skipped), Q, S, R, T (skipped) => not found |
| 590 | (T) cache, Parent, Example, Platform, P, R (skipped), Q, S, R, T (skipped) => not found |

INDEPENDENT CLASS LOADER FOR DYNAMIC CLASS LOADING

BACKGROUND OF THE INVENTION

1. Field of the Invention

The present invention relates to computer programming, and deals more particularly with methods, systems, and computer program products for improving the manner in which classes are dynamically loaded during program execution.

2. Description of the Related Art

There are a number of approaches to dynamically loading interdependent components of executable code (such as plug-ins, bundles, etc.) in modern programming languages. In the Java™ programming language, classes are dynamically loaded using a class loader as an application program executes. ("Java" is a trademark of Sun Microsystems, Inc.) The class loader is responsible for searching for a particular class, and making that class available to the run-time system if found. Once loaded, each Java class object retains a reference to the class loader with which it was loaded. Java class loading is based on a delegation model, wherein a class loader first delegates the class loading responsibility to its immediate parent class loader. If neither that parent class loader nor any of its ancestors, in turn, are able to locate the class, then the initial class loader is used for the loading operation. Inheritance in the class loader chain is under control of the programmer, who may specify an explicit parent relationship when creating a new class loader. Each time a class loader is created, it is associated with one or more locations (such as file tree structures, archives, etc.) that it will be searching for classes.

FIGS. 1A–1C illustrate this prior art dynamic class loading technique with a simple example. Suppose that the following Java code is encountered while running code in the class named "Foo":

new Bar( )

That is, a new instance of the class named "Bar" is to be instantiated. Using standard Java class loading, it is first necessary to determine the class loader used to load Foo. The Java code element 100 in FIG. 1A illustrates syntax which may be used for this purpose, wherein a variable "C" is assigned to the result of invoking the "getClassLoader" method on the Foo class. The next step is to use that class loader to load the class Bar. Syntax which may be used for this purpose is shown at 105, wherein the method "load-Class" on class loader C is invoked with "Bar" as a parameter. The flowchart in FIG. 1C illustrates the logic with which this loadClass method operates. First, a check is made to see if Bar is already in this loader's cache (Block 140). If so, then it is riot necessary to reload the class, and the located value (i.e. the class) is returned (Block 165). Otherwise, a recursive process begins (Block 145) where the parent of this class loader is asked to load the requested class.

For a class to be successfully loaded, the class loader used (or one of its ancestors) must be able to load all of the class' superclasses and interfaces. As a result, if a superclass is loaded by a different loader, that loader must be a parent somewhere in the ancestor chain of the loader used to load the class (Bar, in this example). For example, with reference to the class loader hierarchy 110 in FIG. 1B, suppose the class loader responsible for loading class Foo is class loader "CL3" 125. This class loader therefore requests its parent class loader "CL2" 120 to load class Bar, and so on until either finding an already-loaded Bar or until no more ancestors remain to be checked. In the former case, the test in Block 150 has a positive result, and the located class is returned by Block 165. In the latter case, the test in Block 150 has a negative result and control reaches Block 155. At that point, the class path 120 for class Bar is determined (using the CLASSPATH variable), and a check is made (Block 160) to see if Bar can be located using that class path. If so, then the located class is loaded (BLOCK 170) and immediately initialized; otherwise, an error is returned (Block 175). After the class is loaded in Block 170, control returns to Block 165 to return the loaded class to the caller. This dynamic loading technique is well known in the computer programming art, and code to implement the class loader process is commonly provided as part of Java development toolkits.

There are a number of problems with this prior art class loading approach, however. Because the delegation model is linked to Java's single inheritance class structure, a class loader parent chain must be able to load a complete Java type graph. This necessarily limits subsystems to only one prerequisite, and that prerequisite (and its ancestry) must be able to supply all of the subsystem's ancestor classes: a complex composition of prerequisite components cannot be supported under this approach. In other words, the Java programmer needs to make sure that all type relationships implied in the class implementation (including extended classes, implemented interfaces, declared data member types, argument types of methods, return types of methods, etc.) can be loaded by its single loader chain. When dealing with complex functional relationships, the programmer typically addresses this problem by adding all the required archives, or "jar" files, on a single long class path. This is a less-than-optimal solution. Furthermore, components such as plug-ins are relatively "heavyweight" entities in that they require a considerable amount of resources (i.e. storage) to be allocated, take time to be initialized, and will often trigger the loading of many classes once initialized (which consumes more resources and takes additional time). This approach results in an inefficient use of resources in many cases, and increases the start-up time and the memory footprint of the program in which the plug-in is contained. For example, it may happen that some classes are not actually accessed until a relatively long time after activating the plug-in whose initialization triggered loading of the class, and some may never be accessed. These inefficiencies become especially significant in resource-constrained systems.

Other approaches to dynamic class loading, such as OSGi ("Open Services Gateway Initiative") bundles, use an independent class loader for each component, rather than using the delegation model which has been described with reference to FIGS. 1A–1C. However, OSGi bundles do not address the limitations of dynamic class loaders which have been discussed. OSGi bundles continue to rely on parent relationships during loading, and initialize upon start-up as well. (The term "OSGi bundles" refers to components which adhere to the OSGi Service Gateway Specification. OSGi bundles are archive files containing class files and resources. A bundle's manifest file identifies the bundle's contents and also the packages and services which are imported and exported by that bundle. More information on this specification may be found on the Internet at location http://www.osgi.org/about/spec1.html.)

Accordingly, what is needed is an improved technique for dynamically loading independent components (that is, those components whose classes are not necessarily located within a single functional dependence hierarchy).

SUMMARY OF THE INVENTION

An object of the present invention is to provide an improved technique for dynamically loading independent code components.

Yet another object of the present invention is to provide an improved technique for loading components which are not located within a single functional dependence hierarchy chain.

Another object of the present invention is to provide a technique for dynamically loading components which supports complex prerequisites.

Still another object of the present invention is to provide a technique for dynamically loading components which allows explicitly specifying one or more prerequisite components.

A further object of the present invention is to provide a technique for dynamically loading components which delays initialization and loading of components until the component is needed.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving dynamic loading of components. In one aspect of preferred embodiments, this technique comprises: providing a specification of zero or more prerequisite components for components to be loaded; providing distinct class loaders associated with the components to be loaded; and attempting to load a class from a particular component using the provided class loader associated with that particular component, wherein the provided class loader may invoke class loaders associated with one or more of the prerequisite components if necessary.

Optionally, this technique may further comprise: providing multiple versions of a selected component to be loaded; loading one or more classes from two or more of the provided versions, wherein classes having duplicate names may therefore be loaded; and automatically distinguishing the classes having duplicate names by virtue of their distinct class loaders.

The specification of zero or more prerequisite components may further specify whether components re-export classes of their prerequisite components, and/or which classes of a particular component are to be exposed to other components for which the particular component is a prerequisite component.

In another aspect of preferred embodiments, the technique may comprise: providing distinct class loaders associated with the components to be loaded; monitoring attempts to use the distinct class loaders; and delaying activation of a particular component until the monitoring detects that the class loader associated with that particular component is loading its first class. Optionally, this aspect may be combined with the above-described aspect.

The present invention will now be described with reference to the following drawings, in which like reference numbers denote the same element throughout.

BRIEF DESCRIPTION OF THE DRAWINGS

FIG. 3 provides a set of sample component definitions, illustrating information used by preferred embodiments of the present invention;

FIG. 5 illustrates sample search orders in which component loading may occur when using the example prerequisite relationships in FIG. 2 and the sample component definitions in FIG. 3, according to preferred embodiments of the present invention.

DESCRIPTION OF PREFERRED EMBODIMENTS

The present invention defines improved techniques for dynamically loading components which have prerequisite relationships more complex than the simple single inheritance chains which are supported with prior art dynamic class loading techniques. Multiple prerequisites are supported in this improved technique, and in preferred embodiments, an arbitrary number of prerequisites may be explicitly specified for a component. Furthermore, techniques are disclosed which enable delaying the loading and initialization of components until such time as the component is actually needed, thereby improving overall efficiency of the system. Preferably, implementations of the present invention provide support for both the multiple prerequisite relationships and the delayed initialization, although implementations providing support for either technique individually provide advantages over the prior art and such implementations are within the scope of the present invention.

The techniques disclosed herein are especially beneficial when the component to be loaded is complex, such as a plug-in or bundle which contains a number of classes (although the advantages of the present invention may also be realized in some cases with relatively simple components, such as a single class). Use of plug-ins for providing distributed services is becoming increasingly popular. The term "plug-in" describes a self-contained software component that modifies (i.e. adds or changes) the function available in a particular computing environment. When a user adds a plug-in to a software system, the foundation of the original software system remains intact; the plug-ins communicate with other software through well-defined application programming interfaces ("APIs"). The set of plug-ins in use within a particular computing environment may be supplied by many different vendors, and may enable a wide range of functionality.

Figures 1A, 1B:
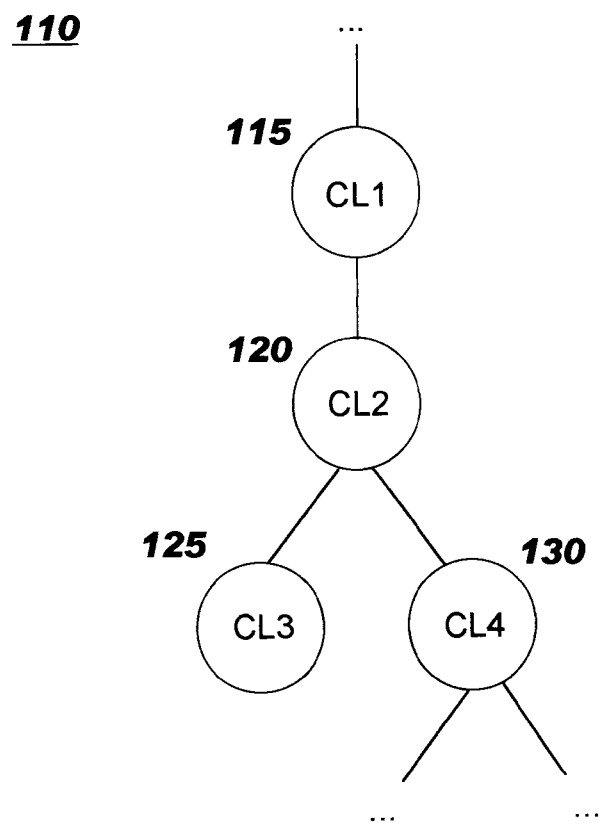
FIG. 1 (comprising FIGS. 1A–1C) illustrates the technique with which Java classes are dynamically loaded, according to the prior art.
Figure 2:
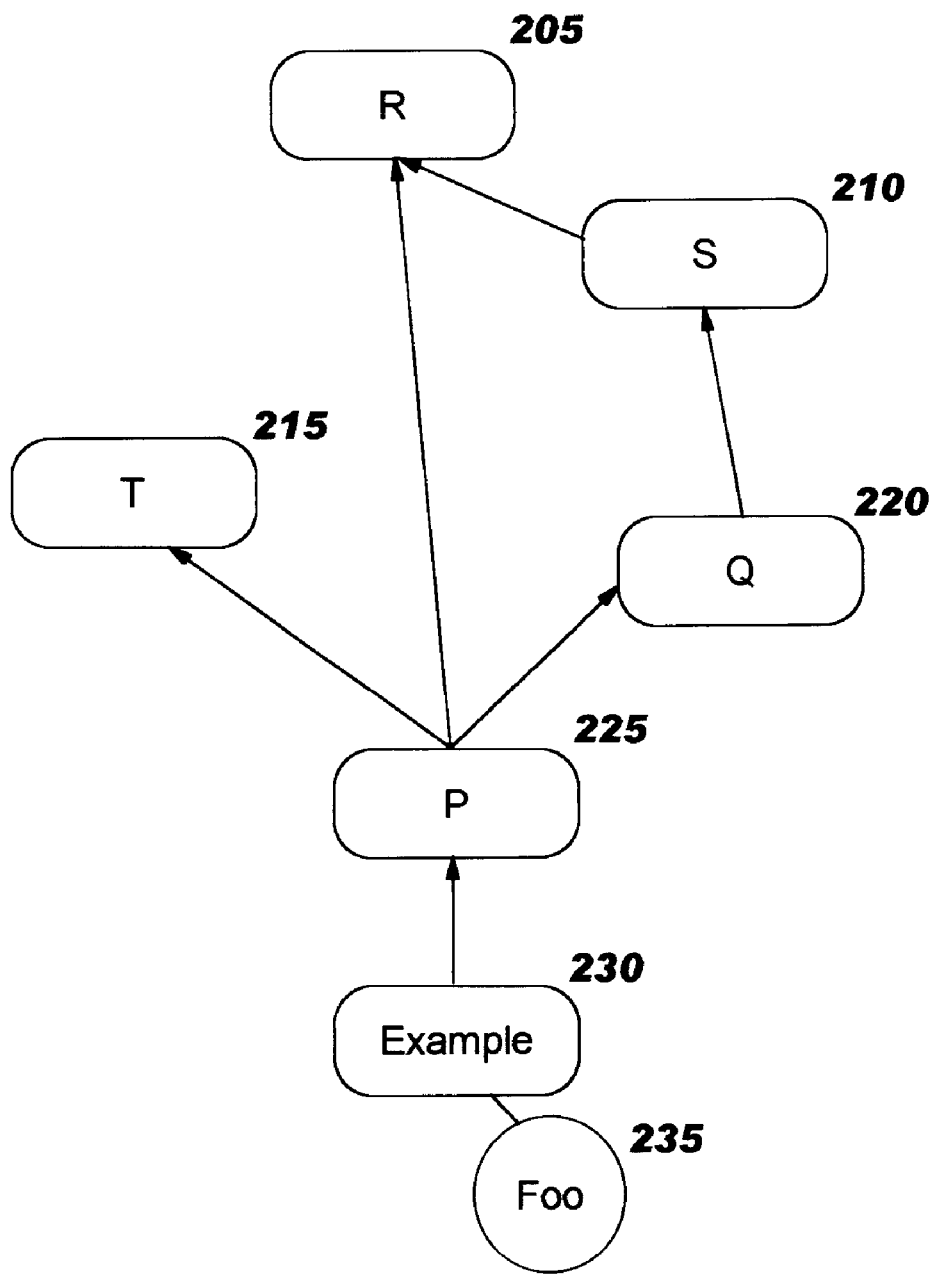
FIG. 2 illustrates an example of complex prerequisite relationships among components.

To maintain security, configurability, and scalability, each plug-in must be provided with a dedicated class loader when using the present invention. As in the prior art, the immediate class path of this class loader contains only the code (i.e. the jars and the directories) for the related plug-in. Since the code in a plug-in may refer to code provided in other plug-ins, a complex prerequisite system of functional dependencies among the plug-ins may be formed. A relatively simple example is depicted in FIG. 2. In this example prerequisite system 200, a plug-in named "Example" 230 contains the class Foo 235. The Example plug-in is dependent on code provided by plug-in P 225. (The direction of the arrows in FIG. 2 indicates the order of each dependency or prerequisite relationship.) Plug-in P, in this example, is dependent on plug-in R 205, plug-in T 215, and plug-in Q 220. Plug-in Q is dependent on plug-in S 210, which in turn is dependent on plug-in R 205. As will be obvious, the graph in this prerequisite system 200 does not adhere to the single inheritance model supported by the prior art dynamic class loaders, which has been described with reference to the tree structure 110 in FIG. 1B. (It should be noted that the terms "plug-in" and "component" are used interchangeably herein to describe the features of the present invention.)

According to the present invention, a particular plug-in specifies its prerequisites explicitly. For example, plug-in explicitly states that it requires plug-in Q if P needs to refer to classes in Q during execution. FIG. 3 illustrates an example 300 of specifying this information, where the relationships in the prerequisite system depicted in FIG. 2 have been specified for each of the six plug-ins which were illustrated therein (see elements 330, 340, 350, 360, 370, and 380), as well as forte "Parent" 310 and "Platform" 320 plug-ins. (All plug-ins implicitly have the Platform as a prerequisite and all class loaders have Parent as their parent.) So, for example, the specification 340 for plug-in P indicates that P is dependent upon (i.e. has as prerequisites) code in R, Q, and T. (As will be obvious, the information illustrated in FIG. 3 is merely representative of one manner in which the information used by the present invention may be specified.)

By defining a class loader that supports this explicit prerequisite specification, it becomes possible to support components having multiple prerequisites in a complex graph structure such as that shown in FIG. 2. The logical class path to be used for a particular component must account for this complex structure, and in preferred embodiments, uses a transitive closure of the set of class paths of the prerequisite components. Thus, the class path for plug-in Q, for example, is logically extended to include not only the classes in its jars and directories but also those classes provided by plug-in S. Information used for creating this logical extension is taken from the syntax shown in FIG. 3. Note that this technique does not require physically adding jars from one component to its dependent components, nor does it require the class loader for a component to be the parent of the class loader of its dependent components. (While existing Java mechanisms enable adding elements to the class path of an individual class loader, Java programs typically use a fixed class path at program start-up. Class paths are not extended programmatically as in the present invention, nor do they account for complex prerequisite relationships of the type described herein. The present invention allows for a logical, multi-way extension of class path information for an individual class loader; the prior art allows for only one-way extension via the parent relationship. While programmatic extension is supported in the prior art, it does not yield the advantages of the present invention: that is, the extensions available in the prior art typically only comprise adding to the end of a class loader's class path.)

In the dependency graph, the arrows determine what classes any one component can "see" (i.e, can make direct programmatic reference to, or make load requests for). A component can therefore see classes from components that are one hop away in the graph; classes that are more than one hop away are not directly visible. This is often insufficient. For example, the classes of P are more than one hop away from Foo. Therefore, it becomes necessary to export classes to the downstream (i.e. dependent) components, enabling classes to be visible to components more than one hop away.

An optional aspect of the present invention enables a component to opt out of re-exporting the classes of its prerequisites. This is shown in FIG. 3 with use of the "export= true|false" parameter of the prerequisite specification clauses. For example, plug-in P specifies that it exports the classes of plug-in Q but does not export those of plug-in R or T (see element 340). Thus, in this case the transitive closure which logically extends plug-in P's class path brings in the classes of plug-ins R, Q, and T. However, since P does not re-export T's classes, P's dependents are not directly exposed to them via P. For example, the Example plug-in will not see T's classes at all. It will see classes from R because P exports Q, Q exports S, and S exports R. The set of prerequisites for a particular plug-in may therefore form an arbitrarily complex class path for that plug-in. Each node in the graph of FIG. 2 has a corresponding dedicated class loader, as stated earlier. When searching for a class of a particular plug-in according to the present invention, the class path of each visible class loader will be searched (if necessary, until the desired class is located). For example, in searching for a class using plug-in P's class loader, the class path of each class loader except that of plug-in Example will be considered.

Another optional aspect of the present invention enables a class loader to provide filtering capabilities as to which classes are exposed. Since a plug-in's class loader is used to load all of its classes, a system without filtering would expose all of a plug-in's classes for use by dependent plug-ins. While this is desirable in the case of API classes, private implementation details are preferably not exposed by default. Thus, a plug-in's specification may include a filtering expression or parameter, referred to herein as the "expose" parameter, to explicitly detail the classes a class loader will load on behalf of class loaders from other plug-ins. Examples are illustrated in FIG. 3. The value of the expose parameter may be expressed using wildcards, if desired in a particular situation. For example, the expose parameter for plug-in P's jar file is shown as "*.api. *", indicating that any API classes in this jar file should be exposed while the expose parameter for the jar file named "internal.jar" is shown as "" to indicate that no classes in this jar file should be exposed. The expose parameter for "Q.jar" is shown at 350 as"*", indicating that all classes in this jar file should be exposed.

Figure 1C:
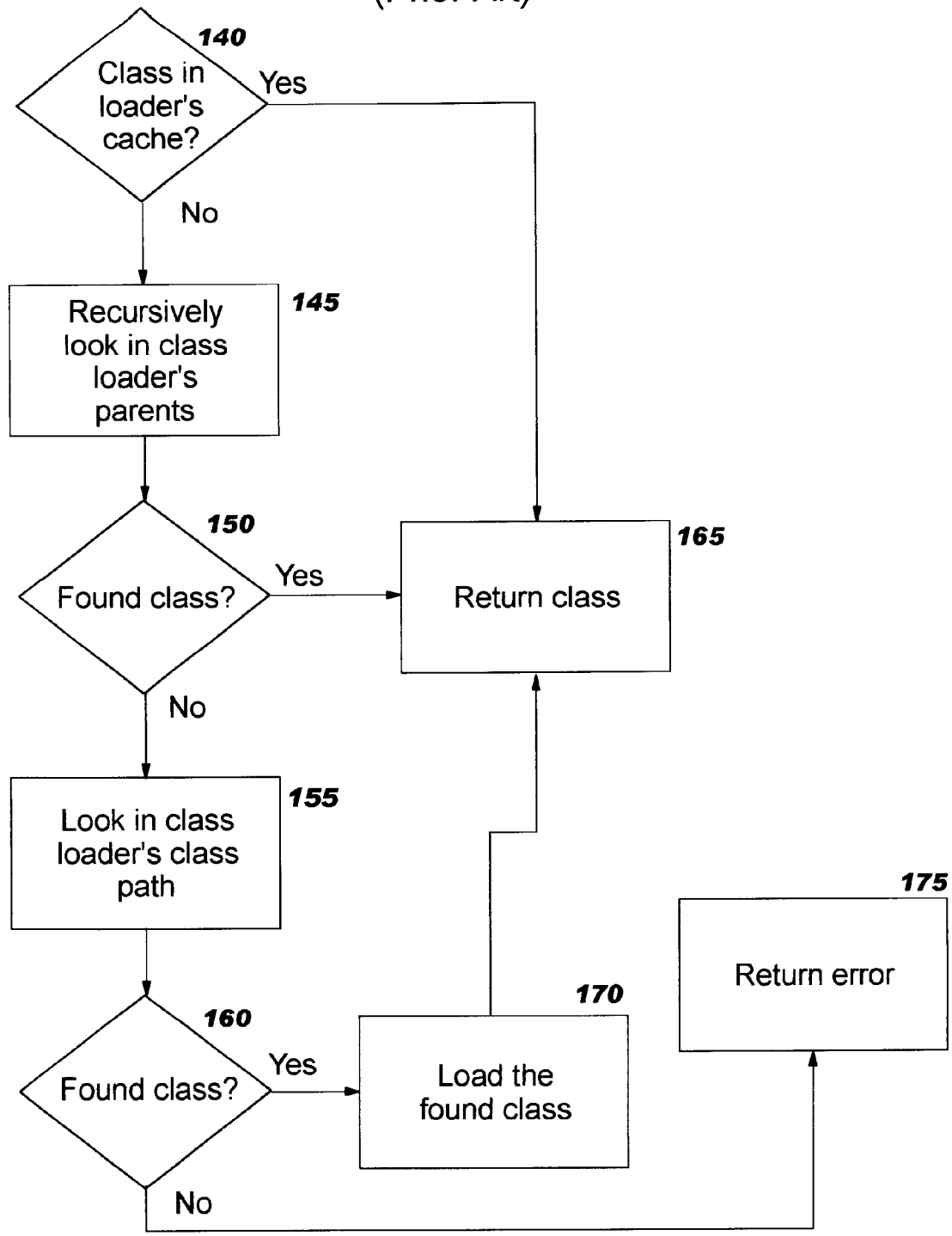

The manner in which class loading occurs when using the novel techniques of the present invention will now be described with reference to the logic depicted in FIG. 4, with which preferred embodiments may be implemented. Referring again to the example of loading class Bar from class Foo, and assuming that all class loaders in the environment have the same parent (nominally, the system class loader), the search begins with the statements 100 and 105 shown in FIG. 1A, as in the prior art. However, rather than searching for the class Bar using the prior art logic in FIG. 1C, class loaders implemented according to preferred embodiments of the present invention invoke the logic in FIG. 4. When first invoking this logic, a Boolean variable referred to herein as "checkParents" is set to TRUE.

Note that use of the checkparents flag is an optional optimization used by preferred embodiments, where all plug-in class loaders have the same Java parent class loader. In the general case, the Java parent chain should be searched for each of the prerequisites, if necessary, until locating the desired class; however, when it is known that all prerequisite class loaders have the same Java parent, as in preferred embodiments, then it is only necessary to follow the Java parent chain once.

The processing of FIG. 4 begins at Block 400, which tests to see if this loader has already been visited. If so, then it is net productive to search this chain again, so the searching stops as indicated by Block 405 and the processing for the current invocation (which may be recursive) of FIG. 4 ends. (Note that a side effect of this test of "already visited" is that any loops that may exist in the prerequisite graph, such as A depends on B, B depends on C, C depends on A, will be broken.) Otherwise, Block 410 checks to see if the desired class is in this class loader's cache. When this test has a positive result, Block 415 checks to see if the class is being exposed (when the filtering aspect has been implemented). If so, then the class has been found, and the value (i.e. the class) is returned by Block 420. When the test in Block 415 has a negative result, however, the class is not to be exposed by this class loader, and control therefore transfers to Block 425 as if the class was not found.

When the class was not available from this loader's cache, Block 425 tests the checkParents flag to see if the parent(s) of this class need to be checked. If so, then a recursive invocation is initiated at Block 430. When the recursive call completes, processing continues at Black 435 which tests to see if the recursive invocation located the class. If it did, the value is returned (Block 440), and the processing of FIG. 4 is complete for the current class loader. If the class was not found in the class loader's parents (i.e. a negative result in Block 435), on the other hand, or if the parent parents were not checked (i.e. a negative result in Block 425), then the class loader's class path is used to see if the class may be found there (Block 445) by searching the jars and file directories associated with that class path.

If the class was found using the class loader's class path (i.e. a positive result in Block 450), then a test is made (Block 455) to see if the class is being exposed, in a similar manner to that described above with reference to Block 415. If so, then the class has been found, and the value is returned (Block 460). If the class is not exposed (i.e. it is being filtered out), however, control transfers from Block 455 to Block 465 as if the class was not found.

At Block 465, the platform's class loader is checked to see if the requested class may be found in that manner by searching the jars and file directories associated with the platform's class path. Note that the platform's parents are not to be checked, however, and thus checkparents is set to FALSE. If the class was found with the platform class loader, the test in Block 470 has a positive result and the located value is returned (Block 475). Otherwise, this loader is added to the list of those loaders already visited (Block 480), and Block 485 invokes a recursive process of checking the class loaders of all prerequisite classes. When the optional export aspect is implemented, this search is limited to those prerequisite classes which have the export parameter set to TRUE. Note that the checkparents flag remains set to FALSE at this point, and therefore the parents of the prerequisite classes will not be checked. If the class is found in a prerequisite (Block 490), then the value is returned (Block 495). Otherwise, control reaches Block 499 because after searching all prerequisites, there are no more places to search for the requested class, and an error indicator is preferably returned.

Note that the notion of a platform class loader is an optimization used by preferred embodiments. This class loader is designed as a prerequisite class loader that is available as an ancestor of all plug-in loaders, without the need to explicitly declare this relationship. By convention, it is the loader that is searched first after a loader fails (at Block 445) to find a class in its own jar(s). Because the platform class loader has no other prerequisites itself, it is not necessary to recursively invoke the processing of FIG. 4 at Block 465.

Referring now to FIG. 5, several example searches are shown which are based on the prerequisite structure in FIG. 2 and the plug-in specifications in FIG. 3. Assume that the class Foo is defined in the plug-in Example, as shown in FIG. 2, and that the syntax "new Bar ( )" is evaluated in a method of class Foo. The leftmost plug-in name in each example of FIG. 5, which is shown enclosed in parentheses, indicates where the class Bar is actually defined for each example search. In example 510, class Bar is located in the Parent plug-in. Thus, the search proceeds by first checking the cache of the class loader for the Example plug-in. Not finding Bar there, the class loader for Parent is checked next; Bar is found there, and the search ends successfully.

Continuing on to the next example search order 520, Bar is actually defined in the Example plug-in. Again, the cache is checked first, and the Bar is not found there so the Parent plug-in is checked next. Not finding Bar there, the Example plug-in is checked, and Bar is successfully located. Example 530 is similar, except that the search fails in the Example plug-in and thus continues on to the Platform plug-in, where Bar is defined.

Examples 540 through 570 illustrate scenarios where Bar is found in a plug-in within the prerequisite graph for the Example plug-in. When Bar is defined in plug-in P, example 540 indicates that plug-in P is searched after failing to find Bar in the Platform plug-in. When Bar is defined in plug-in Q, example 550 indicates that plug-in P is again searched after failing to find Bar in the Platform plug-in; however, not finding Bar in this prerequisite of Example, the search continues. Plug-in R, which is the first-specified prerequisite of plug-in P, is skipped (see Block 485 of FIG. 4) because R is specified with export="false" (see element 340 of FIG. 3), indicating that R's classes will not be exported through P. Thus, the next available prerequisite in the extended class path is plug-in Q, where Bar is defined, and the search therefore ends successfully in this example.

Example 560 illustrates a scenario in which Bar is defined in plug-in R, and is found there (even though R was skipped when traversing from plug-in P). In this case, after checking plug-in Q and failing to find Bar, Q's prerequisite S is checked next, also unsuccessfully. Next, the prerequisite R is reached when traversing from plug-in S, because the export setting is true in this case (see element 370 of FIG. 3). Because R exposes class Bar (see element 360), the search ends successfully. Example 570 covers the case where Bar is defined in plug-in S, and therefore proceeds as already described for example 560, up until locating Bar in S. Example 580 covers the case where Bar is not defined and is not available from any of the class loaders in the prerequisite graph. After searching using each class loader of the extended class path, Bar has still not been located, and the search fails. In example 590, the class Bar is actually located in plug-in T, which is not re-exported by P. As such, even though the class is found, it cannot be supplied to the Example plug-in. Note that the prerequisite search in preferred embodiments is depth-first. That is, a prerequisite's entire load sequence, including its prerequisites, is completed before moving on to the next prerequisite (see Block 485 of FIG. 4).

Figure 6:
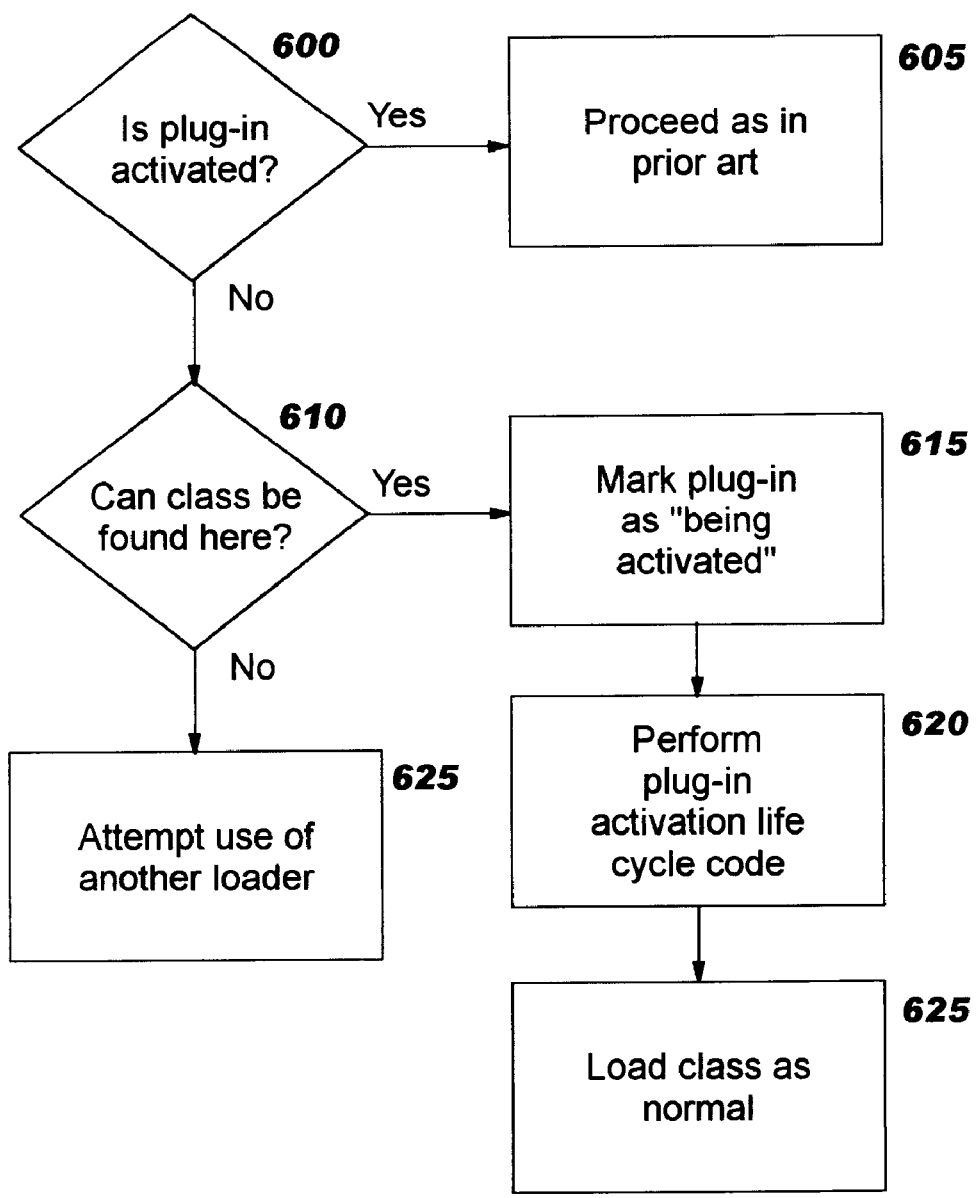
FIG. 6 provides a flowchart illustrating logic which may be used to implement delayed component activation, according to preferred embodiments of the present invention.

FIG. 6 illustrates logic which may be used to enable delaying the initialization of plug-ins and their classes until such time as a class in that plug-in is needed. Because each plug-in has its own class loader, as stated earlier, class loading can be used as a trigger for plug-in activation. That is, plug-ins need not be activated until they are actually used/needed. According to the present invention, a plug-in is activated by watching activity in its associated class loader. As soon as a class loader for a particular plug-in is preparing to load its first class, the associated plug-in is activated. Instead of directly referencing function of the components that are available for loading, which would cause those components to be loaded as system start-up, this aspect of the present invention essentially expresses the reference relationship through indirect means wherein the logical extension concept registers the reference information as a symbolic descriptor, thereby delaying the loading of the components until a class access is detected. (Indirect descriptors are used in preferred embodiments for this registration, rather than direct programmatic references. Upon detecting a class access, an actual class load request occurs, as will now be described.)

If attempting to load a class with a class loader whose plug-in is already activated (a positive result in Block 600), then processing proceeds as in the prior art (Block 605). Otherwise, Block 610 performs a "pit-load" check to see if it is likely that the requested class will be found in this class loader. Note that the class is not actually loaded at this point. Instead, in preferred embodiments this pit-load process comprises checking to see if there is a file with the desired name (when the class is being loaded from a file store). If no such file is found (i.e. Block 610 has a negative result), then the loading process must be attempted with another class loader (unless there are no other class loaders available), as indicated by Block 625. Preferably, the technique which has been described above is used to select the next class loader from the logically extended class path.

If the pre-load check of Block 610 succeeds, then it is assumed that the file will contain a valid, loadable class; therefore, the plug-in is marked as "being activated" in Block 615. Block 620 then performs an activation of the plug-in's life cycle code, in order to initialize the plug-in's run-time state. The actual work to be done in Block 620 depends on the plug-in itself For example, some plug-ins do nothing at this point, others might read previously-stored state data from disk and restore this state, others might open database connections, and so forth. The plug-in must be put in a consistent, functional state so that the classes it loads can be assured that everything is up and running. This technique allows the loading of any exported class to be the trigger for activation of the plug-in. (Otherwise, an alternative technique would be needed, such as requiring all classes to implement an activation check or allowing some limited number of classes to function as plug-in activation points. The technique of the preferred embodiments does not require this type of class-specific approach.) After performing the activation in Block 620, Block 625 loads the class as normal.

This technique guarantees that plug-ins are always activated and consistent before their classes are loaded, and that plug-ins are only activated if the function they provide is actually required. This in turn improves scalability (only the function that is needed is loaded, saving resources), ensures consistency (classes can rely on their plug-ins always being initialized), and enhances isolation (classes for a given plug-in are always managed by that plug-in).

Figure 4A:
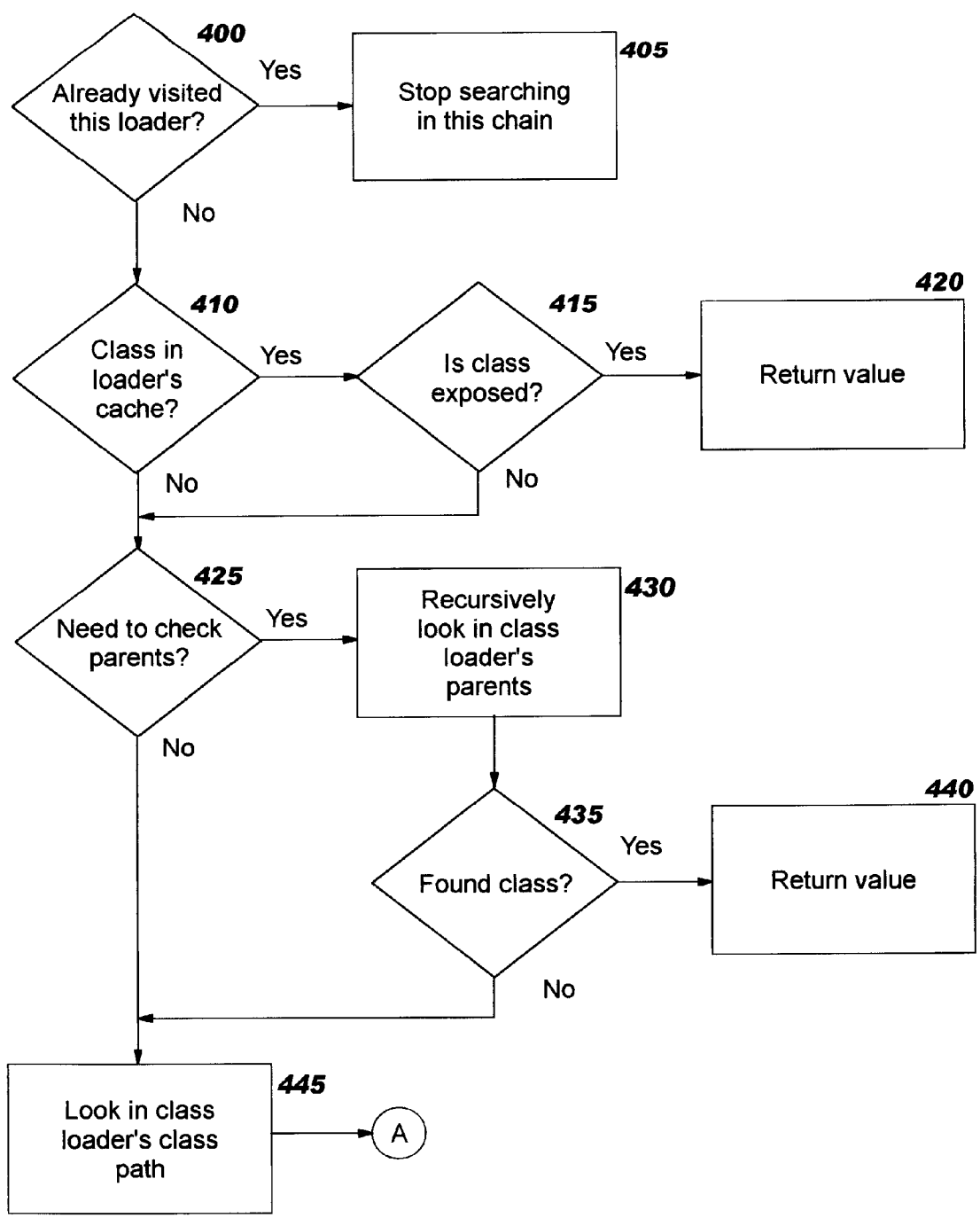
FIG. 4 (comprising FIGS. 4A–4C provides a flowchart setting forth logic which may be used to implement improved dynamic class loading, according to preferred embodiments of the present invention.
Figure 4B:
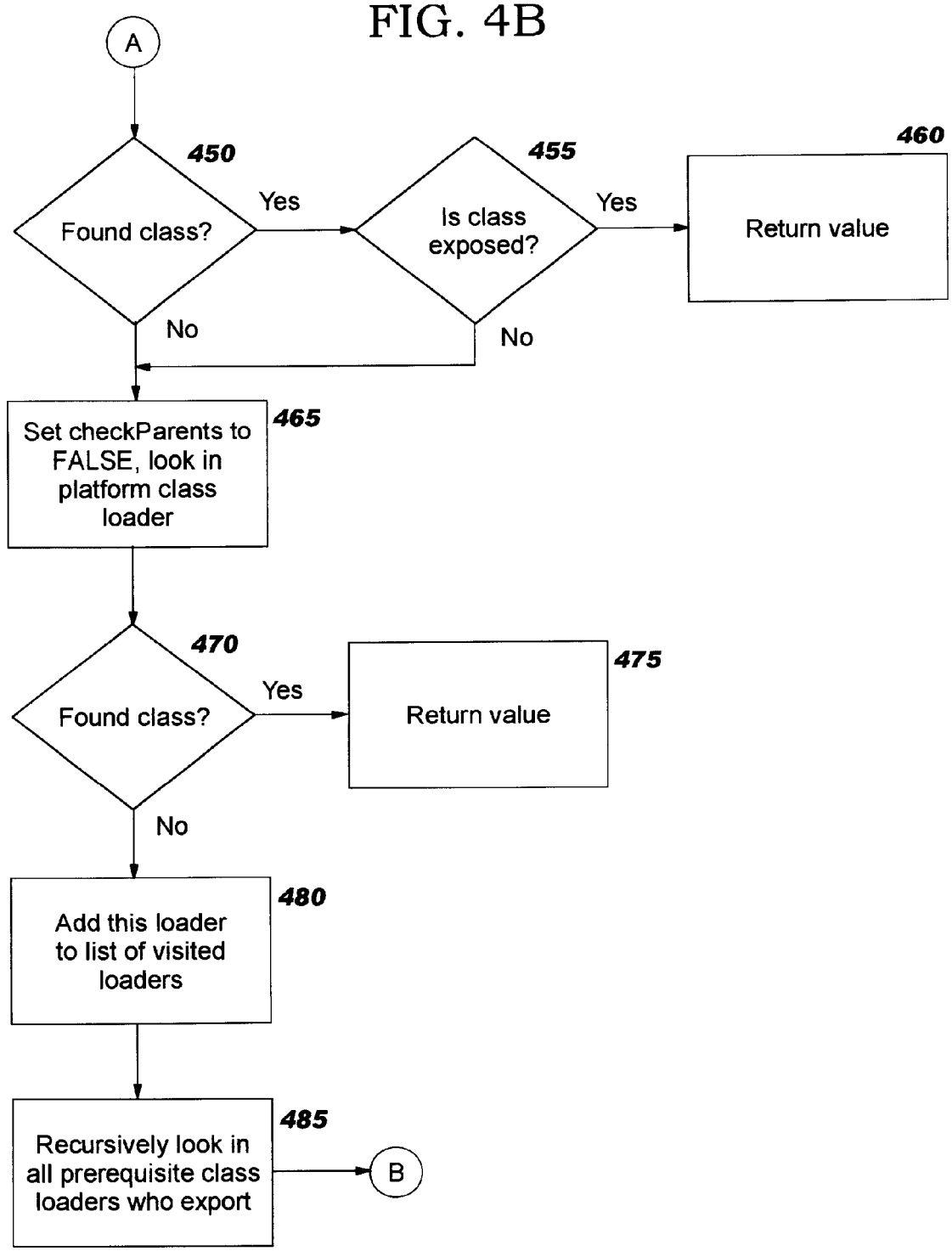
Figure 4C:
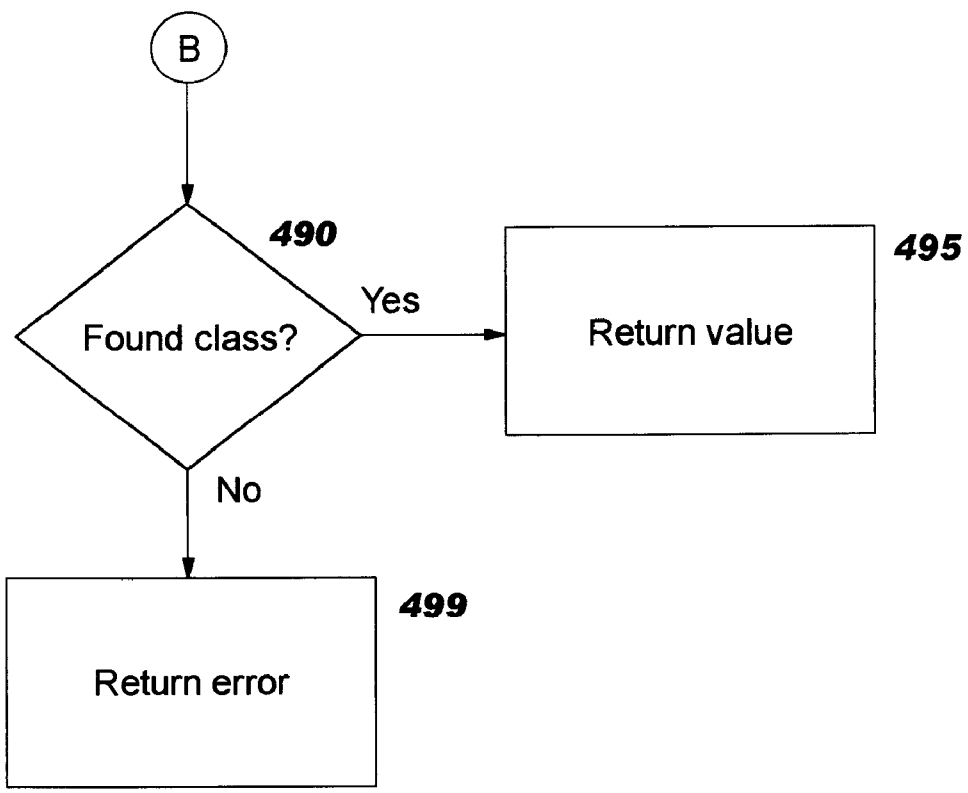

When this delayed activation technique is implemented in addition to the multiple prerequisite relationships technique, the logic depicted in FIG. 6 is preferably merged into the logic of FIGS. 4A through 4C when a class has been successfully located (including a successful result to the exposure tests, when implemented). When this merge is performed, the test in Block 610 and the logic in Block 625 may be omitted.

An added benefit of using the techniques disclosed herein is that multiple versions of the same plug-in (and thus its code) may now be loaded and running simultaneously. For example, plug-in A may specify as its prerequisites that it needs version 2 of plug-in B (e.g. plug-in "B2.0"), whereas plug-in C may specify that it needs version I of plug-in B (e.g. plug-in "B1.0"). Since class uniqueness in Java programming is derived from the fully-qualified class name plus the class loader used to load the class, and the different versions (in this example, B2.0 and B1.0) are actually different plug-ins, each version's classes are loaded by a different loader. Therefore, even if the classes in the different versions have identical names (and in fact, identical code), they will automatically be treated as different classes and so can automatically co-exist.

Thus, it can be seen that use of the multiple prerequisite relationships technique and/or the delayed initialization technique herein provide improvements over the dynamic class loading techniques of the prior art. Either or both the optional filtering and export aspects may be implemented in addition, in order to provide further advantages, as have been described.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems) and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A method of improving dynamic loading of components in a computing network, comprising steps of:

specifying, for one or more components to be loaded, each prerequisite component thereof, wherein each of the components has at least one other ones of the components specified as a prerequisite thereof;

providing distinct class loaders associated with each of the one or more components to be loaded;

attempting to load a class referenced from a particular one of the components using the provided class loader associated with that particular component; and searching through the specified prerequisite components for the particular component and their prerequisite components to attempt to locate the class for loading if the class cannot be located for loading in the particular component, until either (1) successfully locating the class for loading with the provided class loader associated with one of the searched components or (2) concluding that the class cannot be located for loading.

2. The method according to claim 1, further comprising the steps of:

providing multiple versions of a selected component to be loaded;

loading one or more classes from two or more of the provided versions, wherein classes having identical names may therefore be loaded as distinct classes; and automatically distinguishing the classes having identical names by virtue of their distinct class loaders.

3. The method according to claim 1, wherein:

the specifying step comprises specifying, for each component having prerequisite components, whether that component will re-export classes of each of its prerequisite components during the searching step; and when searching a particular component, the searching step does not include any prerequisite components thereof that are specified as not re-exporting classes through the particular component.

4. The method according to claim 1, wherein:

the specifying step further comprises specifying, for each component, which classes of that component are to be exposed, during the searching step, to other components for which the selected component is a prerequisite component; and if the searching step locates the class within a particular component for which the specification indicates that the class is not to be exposed, treating the class as not having been found within the particular component.

5. The method according to claim 1, further comprising the steps of:

monitoring, at run time, attempts to use the distinct class loaders; and delaying activation of a selected one of the components until the monitoring step detects that the class loader associated with that selected component is preparing to load its first class.

6. A method of improving dynamic loading of components in a computing network, comprising steps of:

providing distinct class loaders associated with each of a plurality of components to be loaded;

specifying, for each of the components, each prerequisite component thereof, wherein each of the component has at least one other ones components specified as a prerequisite thereof:

monitoring, at run time, attempts to use the distinct class loaders;

delaying activation of a particular one of the components until the monitoring step detects that the class loader associated with that particular component is preparing to load its first class; and searching through the specified prerequisite components for the particular component and their prerequisite components to attempt to locate the class for loading if the class cannot be located for loading in the particular component, until either (1) successfully locating the class for loading with the provided class loader associated with one of the searched components or (2) concluding that the class cannot be located for loading.

7. A system for improving dynamic loading of components in a computing networks, comprising:

means for specifying, for one or more components to be loaded, each prerequisite component thereof, wherein each of the components has at least one other ones of the components specified as a prerequisite thereof;

means for providing distinct class loaders associated with each of the one or more components to be loaded;

means for attempting to load a class referenced from a particular one of the components using the provided class loader associated with that particular component; and means for searching through the specified prerequisite components for the particular component and their prerequisite components to attempt to locate the class for loading if the class cannot be located for loading in the particular component, until either (1) successfully locating the class for loading with the provided class loader associated with one of the searched components or (2) concluding that the class cannot be located for loading.

8. A computer program product for improving dynamic loading of components in a computing network, the computer program product embodied on one oar more computer-readable media and comprising:

computer-readable program code means for specifying, for one or more components to be loaded, each prerequisite component thereof, wherein each of the components has at least one other ones of the components specified as a prerequisite thereof;

computer-readable program code means for providing distinct class loaders associated with each of the one or more components to be loaded;

computer-readable program code means for attempting to load a class referenced from a particular one of the components using the provided class loader associated with that particular component; and computer-readable program code meats for searching through the specified prerequisite components for the particular component and their prerequisite components to attempt to locate the class for loading if the class cannot be located for loading in the particular component, until either (1) successfully locating the class for loading with the provided class loader associated with one of the searched components or (2) concluding that the class cannot be located for loading.

9. The system according to claim 7, further comprising:

means for monitoring, at run time, attempts to use the distinct class loaders; and means for delaying activation of a selected one of the components until the means tin monitoring detects that the class loader associated with that selected component is preparing to load its first class.

10. The computer program product according to claim 8, further comprising:

computer-readable program code means for monitoring, at run time, attempts to use the distinct class loaders; and computer-readable program code means for delaying activation of a selected one of the components until the computer-readable program code means for monitoring detects that the class loader associated with that selected component is preparing to load its first class.

* * * * *

UNITED STATES PATENT AND TRADEMARK OFFICE
CERTIFICATE OF CORRECTION

PATENT NO.   : 6,748,396 B2
DATED        : June 8, 2004
INVENTOR(S)  : Klicnik et al.

It is certified that error appears in the above-identified patent and that said Letters Patent is hereby corrected as shown below:

Column 1,
Line 53, change "is riot necessary" to -- is not necessary --.

Column 5,
Lines 13-14, change "plug-in explicitly" to -- plug-in P explicitly --.
Line 20, change "as forte" to -- as for --.

Column 6,
Line 59, change "checkparents" to -- checkParents --.

Column 7,
Line 27, change "the parent parents were" to -- the parents were --.

Column 9,
Line 22, change "a "pit-load" check" to -- a "pre-load" check --.

Column 11,
Line 43, change "step comprises" to -- step further comprises --.

Column 12,
Line 8, change "each of the component" to -- each of the components --.
Line 9, change "other ones components" to -- other ones of the components --.
Line 50, change "one oar more" to -- one or more --.
Line 64, change "code meats for" to -- code means for --.

Column 13,
Line 10, change "means tin monitoring" to -- means for monitoring --.

Signed and Sealed this

Eighteenth Day of April, 2006

JON W. DUDAS
*Director of the United States Patent and Trademark Office*